March 29, 1966  Z. BRIERLEY ET AL  3,242,778
MACHINE TOOLS

Filed April 20, 1964  2 Sheets-Sheet 1

INVENTORS
ZACHRY BRIERLEY
ARTHUR SIDNEY WADSWORTH
BY *Kenwood Ross*
ATTORNEY.

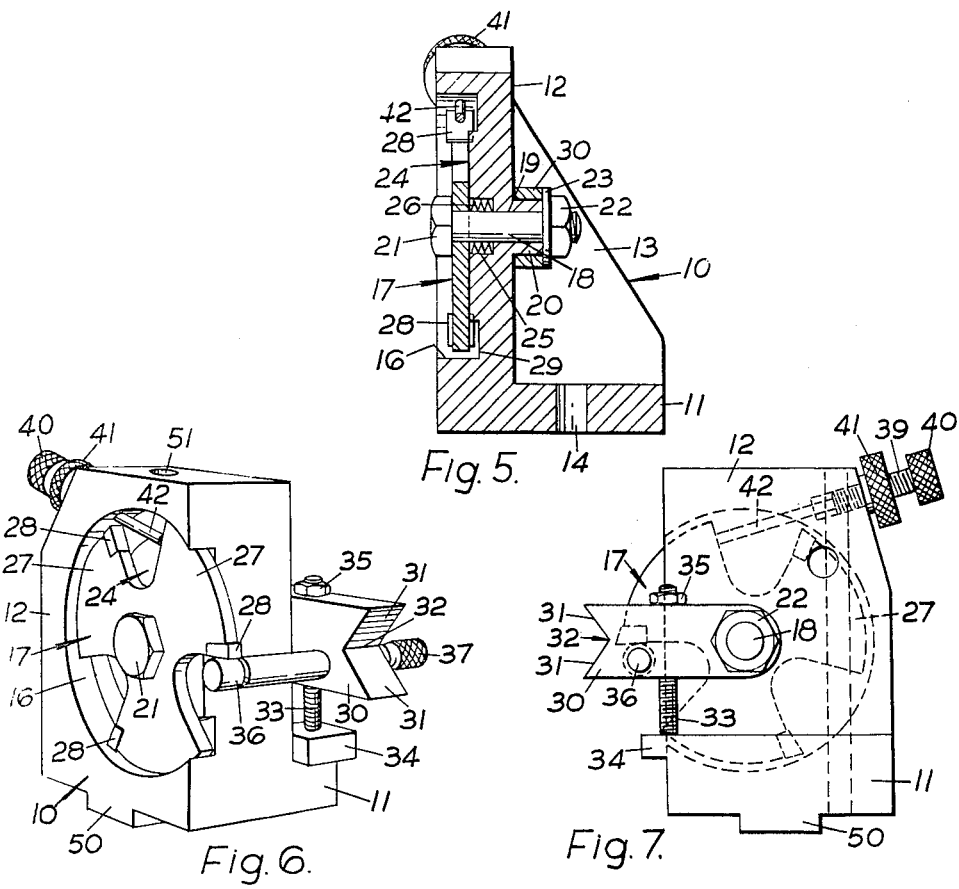

United States Patent Office 3,242,778
Patented Mar. 29, 1966

3,242,778
MACHINE TOOLS
Zachry Brierley, Woodlands, Queens Road, Llandudno, Caernarvonshire, England, and Arthur Sidney Wadsworth, Deganwy, England; said Wadsworth assignor to said Brierley
Filed Apr. 20, 1964, Ser. No. 361,135
4 Claims. (Cl. 82—36)

This invention concerns cutting tools, for use on lathes for performing parting, grooving and like operations.

A serious difficulty in the use of conventional parting-off and like tools arises in the accurate setting up thereof. For optimum operation the cutting tip should be accurately aligned with the centre line of the workpiece and with conventional parting-off and like tools this is a time-consuming operation usually beyond the capabilities of a semiskilled lathe operator. As a result, there is a strong temptation for an operator, particularly if on piece-work, to try to obtain, from a tool, a longer working life than is reasonable, and instead of calling a setter to fit a fresh tool when an existing tool has become slightly blunt, he will try to perserve with a worn tool until such time as replacement is absolutely essential. The natural consequence of this is that unsatisfactory work is produced and tools are frequently used until they acquire a condition necessitating major work thereon to render them reusable.

An object of this invention is to provide a cutting tool as aforesaid, which is easy to set and use, and wherein exchange of cutting tips can be effected quickly and simply without the need for skilled labour.

With this object in view, the present invention provides a cutting tool, for use on a lathe comprising a cutter element adjustably mounted upon a tool holder adapted for mounting upon a lathe, a locator being provided upon the holder so as to be engageable with a circular-sectioned element or workpiece held in the lathe's chuck, said locator carrying an abutment engageable by the cutter element to locate the latter in an operative position with a cutter tip thereof in alignment with the centre line of the circular-sectioned element or workpiece, and means for locking the cutter element, in its operative position, relative to the tool holder.

The cutter element preferably comprises a rotary disc having a number of cutter tips thereon, at spaced intervals around its periphery.

In order that the invention may be fully understood, it will be described further, by way of example, with reference to the accompanying drawings, in which:

FIG. 5 is a fragmentary cross-sectional taken on the line V—V of FIG. 2;

FIG. 6 is a front perspective view of a second embodiment of the tool of the invention; and FIG. 7 is a rear view of the same tool.

Figure 1:
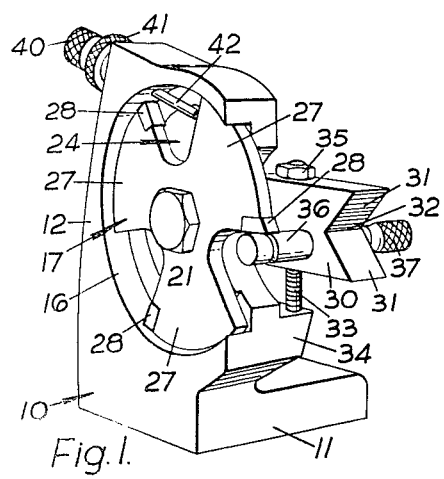
FIG. 1 is a front perspective view of a first embodiment of the tool of the present invention.

Referring firstly to FIGS. 1 to 5, a cutting or parting-off tool according to the present invention comprises a tool holder in the form of a body 10 composed of a base 11 and upright 12 which are integral with one another and with a stiffening web 13. The base 11 is bored at 14 (FIG. 5) to enable the tool to be bolted onto a feed carriage or turret (not shown) of a lathe so as to be capable of being fed from side to side of the bed of the lathe, i.e. transversely to the axis of the usual chuck 15 (FIG. 3) of the lathe and in a horizontal plane.

At one side, the upright 12 is recessed at 16 to accommodate a circular disc-like cutter element 17 carried by a bolt 18 extending through a central aperture 19 (FIG. 5) provided in the upright 12 and in a boss 20 projecting therefrom at the side remote from the recess 16. The cutter element 17 is positioned so as to project from the upright 12 at one side thereof. The head 21 of the bolt 18 abuts the cutter element 17 and a nut 22 on the bolt abuts a washer 23 which in turn abuts the boss 20. With this arrangement, therefore the cutter element 17 can be clamped tightly against the adjacent face 24 of the upright 12 by tightening the nut 22, whereby to lock the cutter element 17 in any desired adjusted position.

The aperture 19 is counter bored at 25 to accommodate spring discs 26 or the like which serve, when the nut 22 is slackened on the bolt 18, to urge the cutter element 17 away from the upright 12, thereby ensuring that the element 17 can readily be rotated as soon as the nut is slackened.

The cutter element 17 has three or more U-shaped or segment-like notches formed therein so that it is shaped to provide three or more radial wings or blades 27. Each such blade 27 has, at a corresponding corner, a hard metal cutter tip 28 secured thereto, each such tip being shaped geometrically to provide appropriate cutting edges standing around of the cutter element 17 both at the circumference thereof and at each side face thereof. To avoid such cutter tips 28 engaging the upright 12 of the tool holder, the recess 16 of the latter is provided with an annular groove 29 in correspondence with such tips 28.

Swingably located on the boss 20, and retained thereon by the washer 23, is a locator arm 30, this arm 30 having a V-shaped notch in its end remote from the boss 20 and defined by inclined surfaces 31 which meet at a line 32 which is accurately parallel to the axis of the boss 20 and the bolt 18. The two surfaces 31 diverge symmetrically from an imaginary plane through the axis of the bolt 18 and the line 32. An adjustable stop screw 33 extends through a threaded hole in the arm 30 in the swinging plane thereof, and is aligned with a protruding stop 34 projecting from the upright 12 at the side remote from the cutter element 17. A locking nut 35 on the screw 33 enables the latter to be locked in any desired adjusted position.

The locator arm 30 is also bored accurately parallel to its swinging axis to accommodate a circular-sectioned anvil or abutment peg 36 which is slidable axially in the arm 30. The bore in which the abutment peg 36 is accommodated is also accurately positioned so as to be tangential to the aforesaid imaginary plane through the axis of the bolt 18 and the line 32, and the end of the peg 36 remote from the cutter element 17 is reduced in diameter and knurled at 37 to facilitate manual sliding thereof.

A threaded bore 38 in the upright 12 accommodates a threaded fine adjustment screw 39 having a knurled head 40 and provided with a lock nut 41. This fine adjustment screw 39 has an elongated shank 42 which extends into the recess 16 at an angle so that it can engage against an edge of one of the wings or blades 27 of the cutter element 17.

Figure 3:
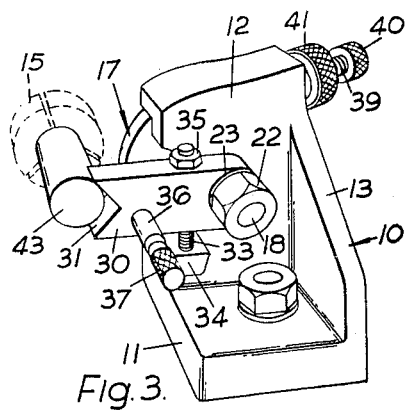
FIG. 3 is a rear perspective view of the same tool, indicating the manner in which the locator of the tool is used.

Assuming the tool to be mounted onto the feed carriage or turret of a lathe, the setting up thereof is effected as follows. Firstly, as shown in FIG. 3, a circular rod 43 is centered in the chuck 15. This rod need not necessarily be the workpiece which is to be machined.

Figure 2:
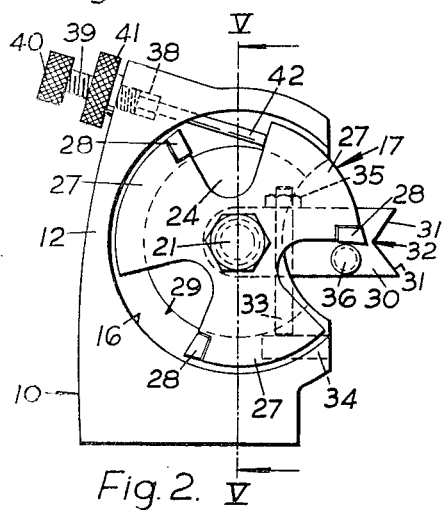
FIG. 2 is a front elevation of the tool of FIG. 1.
Figure 4:
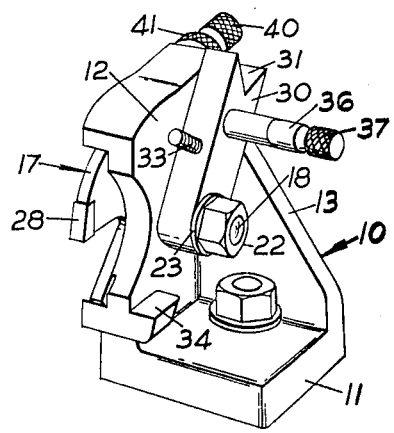
FIG. 4 is a perspective view showing the locator in an inoperative position.

Next, the locking nut 35 is released, and the stop screw 33 is screwed away from the stop 34, whereupon the feed carriage or turret is fed towards the rod 43, with the locator arm 30 substantially in a horizontal position as shown in FIGS. 1, 2 and 3, such feed being continued until both the inclined surfaces 31 just touch the rod 43 as shown in FIG. 3. When this is achieved, the uppermost surface of the abutment peg 36 is accurately located so as to lie in a plane through the centre line of the bolt 18 and the axis of the rod 43. The stop screw 33 is now screwed up until it just touches the stop 34 and the locking screw 35 is thereupon tightened. Now, if the rod 43 is taken away, the locator arm can be swung between its operative adjusted position (as shown in FIGS. 1, 2 and 3) and an out of the way position (as shown in FIG. 4) and upon subsequent return to the operative position it will always be accurately arrested thereat by reason of the stop screw 33 abutting the stop 34.

Now that the operative position of the locator arm has been set, this arm, in turn, can readily be employed for setting the cutter element 17. To do this, the locator arm is brought to its operative position; the lock nut 41 is released and the fine adjustment screw 39, together with the shank 42, is removed; and the nut 22 is slackened slightly on the bolt 18 to release the cutter element 17 sufficiently to enable it to be rotated.

Rotation of the cutter element 17 is then effected until the abutment peg 36 is aligned with one of the notches between adjacent ones of the wings or blades 27, and the abutment peg 36 is then slid axially until it extends through such notch, as can be seen in FIGS. 1 and 2. The cutter blade 27 is now rotated (in a clockwise direction when considered with respect to FIGS. 1 and 2) until the cutter tip 28 at one side of the corresponding notch abuts the uppermost surface of the abutment peg 36. This brings the cutter element 27 into an adjusted position, therefore, wherein one of the tips 28 is disposed with its cutting edges disposed accurately on the plane through the axis of the bolt 18 and the axis of any workpiece held by the chuck 15.

The fine adjustment screw 39 is now replaced in its illustrated position and is screwed up until the tip of the shank 42 thereof abuts the corresponding wing or blade 27 of the cutter element 17 and holds the latter reliably with the respective tip 28 still contacting the abutment peg 36 but without necessarily applying any excessive pressure thereto. The nut 22 is now tightened so as to clamp the cutter element tightly to the upright 12 of the holder, and adjustment of the cutter element has been completed. To render the tool ready for use, the abutment peg 36 is slid axially away from the cutter element 17 and the locator arm is then swung to the inoperative position shown in FIG. 4. The tip 28 exposed at the front of the tool holder will accurately align with the centre of any workpiece which may be inserted in the chuck 15 and efficient cutting and/or parting-off can be achieved.

It will be appreciated that the setting up of the tool as described can be effected very easily and does not require any special skill. Furthermore, once the stop screw 33 of the locator arm 30 has been set and locked, resetting of the cutter element can be effected simply and quickly. Should the cutter element 17 become unintentionally moved (e.g., as a result of insufficient tightening of the nut 22 on the bolt 18) then it can readily be reset by ensuring that the respective wing or blade 27 abuts against the adjustment screw shank 42 and retightening the nut 22.

When one of the cutter tips 28 has become worn, it is quite a simple job to bring a fresh tip 28 into use. This is done by removing the adjustment screw 39, slackening the nut 22, indexing the cutter element 17 around until the next adjacent cutter tip 28 is exposed at the front of the tool holder, moving the locator arm 30 to its operative position, sliding the abutment peg 36 to project adjacent the new cutter tip, rotating the cutter element 17 until such new cutter tip 28 touches the peg 36, replacing and locking the adjustment screw 39, the tightening the nut 18. All this can be done quite rapidly by a semi-skilled operative and does not require the lathe to be idle for any considerable period.

When all of the cutter tips 28 have become worn or blunt, a fresh cutter element can very simply be substituted into the tool in a very short time.

The tool accordingly favours the frequent changing and replacement of the cutter tips 28 so that, in practice, with use of the tool of the invention the cutter tips 28 are not retained in use after their efficiency has become impaired by bluntness. This means that the whole cutter elements are replaced when the tips 28 thereof are in very satisfactory condition just requiring a minimum of regrinding to render them fully reusable.

FIGS. 6 and 7 of the drawings show a modification of the tool already described, and similar reference numerals have been allocated to parts which are similar to those already described. In this instance, the upright 12 of the body of the tool is in the form of a substantial block having a tongue 50 in its undersurface for engagement in a complementary groove in the corresponding part of a lathe with which the tool is to be employed, a hole 51 being provided right through the block for a holding down bolt (not shown). Since the upright 12 is of substantial form, no stiffening web is required between such upright 12 and projecting base part 11.

This embodiment of the tool is set up and used in exactly the same way as the embodiment of FIGS. 1 to 5.

The invention is not confined to the precise details of the foregoing examples and variations may be made thereto. For example, it is not essential that the cutter element should be in the form of a disc providing a plurality of cutter tips 28, and a swingable bar-like element provided with a single cutter tip could be employed. Where a disc-like element is employed, the arrangement can, if desired, provide for more than three cutter tips 28. Other modifications are, of course, possible.

We claim:

1. A cutter tool comprising, a tool holder adapted for mounting upon a lathe, a boss on one side of said tool holder, an aperture extending through said tool holder and said boss, a bolt extending through said aperture, a cutter element adjustably retained against the side of said tool holder remote from said boss by said bolt, a cutter tip on said cutter element, a locator swingably mounted upon said boss so as to be engageable with a circular-sectioned workpiece held in the lathe's chuck, and an abutment carried by said locator and engageable by said cutter element to locate said cutter element in an operative position with said cutter tip in alignment with the centre of said workpiece, said bolt serving as means as locking said cutter element to said tool holder and for retaining said locator on said boss.

2. A cutter tool comprising, a tool holder adapted for mounting upon a lathe, a boss on one side of said tool holder, an aperture extending through said tool holder and said boss, a bolt extending through said aperture, a cutter element retained by said bolt against the side of said tool holder remote from said boss, a cutter tip on said cutter element, a locator mounted by one end on said boss and having, in its other end, a V-shaped recess defined by inclined surfaces which meet at a line parallel to the axis of said bolt and which diverge symmetrically from an imaginary plane through said axis and said line, said locator being swingable about said boss a position wherein said V-shaped recess is engageable with a circular-sectioned workpiece held in the lathe's chuck, and an abutment carried by said locator and engageable by said cutter element to locate said cutter element in an operative position with said cutter tip in alignment with the centre of said workpiece, said bolt serving as means for locking said cutter element to said tool holder and for retaining said locator on said boss.

3. A cutter tool comprising, a tool holder adapted for mounting upon a lathe, a cutter element adjustably mounted upon said tool holder, a cutter tip on said cutter element, a locator carried upon said holder so as to be engageable with a circular-sectioned workpiece held in the lathe's chuck, an abutment peg axially slidable in a bore in said locator between an in use position engageable by said cutter element in an operative position with said cutter tip in alignment with the centre of said workpiece and an out of use position clear of said cutter element, and means for locking said cutter element to said tool holder.

4. A cutter tool comprising, a tool holder adapted for mounting upon a lathe, a boss on one side of said tool holder, a recess in the other side of said tool holder, an aperture extending through said tool holder and said boss, a bolt extending through said aperture, a cutter element rotatably retained in said recess by said bolt, with part of said cutter element projecting from said tool holder, said cutter element being in the form of a disc having notches at intervals around its periphery to divide it into a plurality of wings, a cutter tip on one corner of each said wing, a locator mounted by one end on said boss and having in its other end, a V-shaped recess defined by inclined surfaces which meet at a line parallel to the axis of said bolt and which diverge symmetrically from an imaginary plane through said axis and said plane, said locator being swingable about said boss to a position wherein said V-shaped recess is engageable with a circular-sectioned workpiece held in the lathe's chuck, an abutment peg axially slidable in a bore in said locator between an in use position engageable by said cutter element to locate said cutter element in a seletced one of a plurality of operative positions with one of said cutter tips in alignment with the center of said workpiece, and an out of use position clear of said cutter element, and an adjustable stop screw extending through said locator and engageable with a stop on said tool holder when said locator is engaged with said workpiece, and a cutter adjusting screw extending through a threaded hole in said tool holder and engageable with said cutter element, when said cutter element is in engagement with said abutment peg, for preventing movement of said cutter element, said bolt serving as locking means for locking said cutter element to said tool holder.

References Cited by the Examiner
UNITED STATES PATENTS

| | | |
|---|---|---|
| 897,625 | 9/1908 | Keel. |
| 1,299,712 | 4/1919 | Halstead _____ 82—36 |
| 2,343,309 | 3/1944 | Lloyd _____ 82—34 |
| 2,777,210 | 1/1957 | Johnson et al. _____ 33—185 |

WILLIAM W. DYER, Jr., *Primary Examiner.*

L. VLACHOS, *Assistant Examiner.*